(12) United States Patent
Gupta et al.

(10) Patent No.: US 10,309,762 B2
(45) Date of Patent: Jun. 4, 2019

(54) REFERENCE COORDINATE SYSTEM DETERMINATION

(71) Applicant: QUALCOMM Incorporated, San Diego, CA (US)

(72) Inventors: Prince Gupta, San Diego, CA (US); Daniel Wagner, Vienna (AT); Gerhard Reitmayr, Vienna (AT); Alessandro Mulloni, Vienna (AT)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/182,750

(22) Filed: Jun. 15, 2016

(65) Prior Publication Data

US 2016/0300340 A1 Oct. 13, 2016

Related U.S. Application Data

(62) Division of application No. 13/787,525, filed on Mar. 6, 2013.

(Continued)

(51) Int. Cl.
*G06T 7/70* (2017.01)
*G01B 11/00* (2006.01)
*G06T 19/00* (2011.01)

(52) U.S. Cl.
CPC ............. *G01B 11/002* (2013.01); *G06T 7/70* (2017.01); *G06T 19/006* (2013.01); *G06T 2207/10028* (2013.01)

(58) Field of Classification Search
CPC ......... G06T 7/004; G06T 7/70; G06T 19/006; G06T 2207/10028; G01B 11/002

(Continued)

(56) References Cited

U.S. PATENT DOCUMENTS 7,317,456 B1 1/2008 Lee
8,442,307 B1 * 5/2013 Anati ................. G06T 7/73
382/154

(Continued)

FOREIGN PATENT DOCUMENTS

CN 101286234 A 10/2008
CN 101598540 A 12/2009

(Continued)

OTHER PUBLICATIONS

Gordon, G., Billinghurst, M., Bell, M., Woodfill, J., Kowalik, B., Erendi, A., & Tilander, J. (Sep. 30, 2002). The use of dense stereo range data in augmented reality. Proceedings of the 1st International Symposium on Mixed and Augmented Reality (ISMAR), 14-23. IEEE Computer Societyy. ISBN: 978-0-7695-1781-0 XP3010620938.

(Continued)

*Primary Examiner* — Nhan T Tran

(74) *Attorney, Agent, or Firm* — Hunter Clark PLLC

(57) ABSTRACT

A method of determining a reference coordinate system includes: obtaining information indicative of a direction of gravity relative to a device; and converting an orientation of a device coordinate system using the direction of gravity relative to the device to produce the reference coordinate system. The method may also include setting an origin of the reference coordinate system and/or determining a scale value of the reference coordinate system. The method may also include refining the reference coordinate system.

16 Claims, 11 Drawing Sheets

Related U.S. Application Data

(60) Provisional application No. 61/722,023, filed on Nov. 2, 2012.

(58) Field of Classification Search
USPC .......................................................... 382/154
See application file for complete search history.

(56) References Cited

U.S. PATENT DOCUMENTS

| | | | | |
|---|---|---|---|---|
| 8,542,252 | B2* | 9/2013 | Perez | G06K 9/00201 |
| | | | | 345/420 |
| 2003/0080979 | A1* | 5/2003 | Satoh | G06F 3/012 |
| | | | | 345/633 |
| 2005/0253871 | A1 | 11/2005 | Anabuki et al. | |
| 2006/0078215 | A1 | 4/2006 | Gallagher | |
| 2010/0034426 | A1* | 2/2010 | Takiguchi | G01C 21/3602 |
| | | | | 382/106 |
| 2010/0094460 | A1 | 4/2010 | Choi et al. | |
| 2010/0208057 | A1* | 8/2010 | Meier | G06T 7/75 |
| | | | | 348/135 |
| 2011/0227945 | A1 | 9/2011 | Ishige et al. | |
| 2011/0234791 | A1 | 9/2011 | Miyashita et al. | |
| 2012/0113223 | A1* | 5/2012 | Hilliges | G06F 3/00 |
| | | | | 348/46 |
| 2012/0182289 | A1 | 7/2012 | Chang et al. | |
| 2012/0210255 | A1 | 8/2012 | Ooi et al. | |
| 2012/0223937 | A1 | 9/2012 | Bendall | |
| 2012/0256916 | A1* | 10/2012 | Kitamura | G01B 11/24 |
| | | | | 345/419 |
| 2012/0256961 | A1 | 10/2012 | Ogasawara et al. | |
| 2012/0293550 | A1 | 11/2012 | Lo et al. | |
| 2013/0002649 | A1* | 1/2013 | Wu | G06T 19/006 |
| | | | | 345/419 |
| 2013/0300637 | A1* | 11/2013 | Smits | G03B 35/18 |
| | | | | 345/8 |
| 2013/0300740 | A1* | 11/2013 | Snyder | G06F 3/016 |
| | | | | 345/420 |
| 2014/0016857 | A1* | 1/2014 | Richards | G06T 7/55 |
| | | | | 382/154 |
| 2014/0123507 | A1 | 5/2014 | Gupta et al. | |
| 2014/0228118 | A1* | 8/2014 | Hardy | G06T 19/006 |
| | | | | 463/31 |

FOREIGN PATENT DOCUMENTS

| | | |
|---|---|---|
| EP | 1306809 A2 | 5/2003 |
| EP | 2508233 A2 | 10/2012 |
| JP | 2005107248 A | 4/2005 |
| JP | 2011107893 A | 6/2011 |
| JP | 2011186536 A | 9/2011 |
| JP | 2011197777 A | 10/2011 |
| JP | 2012128779 A | 7/2012 |
| JP | 2012168798 A | 9/2012 |

OTHER PUBLICATIONS

Kelly, J., & Sukhatme, G. S. (Dec. 2009). Visual-inertial simultaneous localization, mapping and sensor-to-sensor self-calibration. International Symposium on Computational Intelligence in Robotics and Automation (CIRA), 360-368. IEEE.

Lim, H., Lee, S. O., Lee, J. H., Sung, M. H., Cha, Y. W., Kim, H. G., & Ahn, S. C. (Aug. 22, 2012). Putting real-world objects into virtual world: fast automatic creation of animatable 3D models with a consumer depth camera. International Symposium on Ubiquitous Virtual Reality (ISUVR), 38-41. IEEE. DOI: 10.1109/ISUVR.2012.12 ISBN: 978-1-4673-2258-4. XP032234865.

Partial International Search Report—PCT/US2013/059148—ISA/EPO—dated Feb. 28, 2014—5 pgs.

International Search Report and Written Opinion—PCT/US2013/059148—ISA/EPO—dated May 12, 2014—21 pgs.

International Preliminary Report on Patentability—PCT/US2013/059148, The International Bureau of WIPO—Geneva, Switzerland, dated May 14, 2015, 15 pgs.

\* cited by examiner

REFERENCE COORDINATE SYSTEM DETERMINATION

CROSS-REFERENCE TO RELATED APPLICATIONS

This application is a divisional of U.S. patent application Ser. No. 13/787,525, filed on Mar. 6, 2013, entitled, "REFERENCE COORDINATE SYSTEM DETERMINATION", which claims the benefit of U.S. Provisional Application No. 61/722,023, filed Nov. 2, 2012, entitled "Simultaneous Localization and Mapping Coordinate Systems," both of which are incorporated by reference herein in their entirety for all purposes.

BACKGROUND

Augmented Reality (AR) provides a view of a real-world environment that is augmented with computer-generated audio and/or visual content. The audio and/or visual content can be overlaid over or integrated into an image or video of the real-world environment captured using a camera of a mobile device, or displayed on a transparent or semi-transparent screen through which a user is viewing the real-world environment. For example, an augmented reality application may be implemented on a mobile phone or tablet computer that includes a camera that can be used to capture images or video of a view of the real-world environment and a display that can be used to display an augmented view of the real-world environment, and/or on a head-mounted display (HMD).

The device can include one or more sensors that collect data that can be used to determine the position, orientation, speed, and/or direction of movement of the device. This information can be used to assist the device in generating augmentation content. The sensors can also be used to collect input information from a user, such as touchscreen selections or other input information that can be used to allow the user to navigate the augmented content displayed on the device.

In a simultaneous localization and mapping (SLAM) system (e.g., AR, robotics, etc.), typically there is a known reference target in the environment, e.g., in a field of view of a camera. If no known reference target is in the environment, a coordinate system for the SLAM may be defined arbitrarily. For example, the pose (position and orientation) of the camera when tracking begins may be used to define the coordinate system for the SLAM.

SUMMARY

An example method of determining a reference coordinate system includes: obtaining information indicative of a direction of gravity relative to a device; and converting an orientation of a device coordinate system using the direction of gravity relative to the device to produce the reference coordinate system.

Implementations of such a method may include one or more of the following features. The method further includes obtaining information indicative of a direction perpendicular to gravity and wherein the converting comprises converting the orientation of the device coordinate system using the direction perpendicular to gravity. The direction perpendicular to gravity is one of magnetic north or a projection of a viewing direction of a camera of the device onto a plane perpendicular to gravity. The method further includes setting an origin of the reference coordinate system. Setting the origin comprises: obtaining a point cloud; and determining a geometric center of a substantially planar portion of the point cloud. Setting the origin comprises: obtaining a point cloud; and determining an intersection of a view direction of a camera of the device and a plane corresponding to a substantially planar portion of the point cloud.

Also or alternatively, implementations of the method may include one or more of the following features. The method further includes calculating a scale value and producing the reference coordinate system using the scale value. Calculating the scale value comprises: obtaining a point cloud; and comparing a dimension of the point cloud to a fixed size. Calculating the scale value comprises calculating the scale value such that an origin of the reference coordinate system will have a predetermined distance from the device. Calculating the scale value comprises using absolute measurements from one or more input sensors of the device. The one or more input sensors comprise an accelerometer or a plurality of cameras. The method further includes refining the reference coordinate system. Refining the reference coordinate system comprises using information from the reference coordinate system and at least one previously-determined coordinate system to generate a combination of the reference coordinate system and the at least one previously-determined coordinate system.

An example device for determining a reference coordinate system includes: means for obtaining information indicative of a direction of gravity relative to the device; and means for converting an orientation of a device coordinate system using the direction of gravity relative to the device to produce the reference coordinate system.

Implementations of such a device may include one or more of the following features. The device further includes means for obtaining information indicative of a direction perpendicular to gravity and wherein the means for converting are for converting the orientation of the device coordinate system using the direction perpendicular to gravity. The direction perpendicular to gravity is one of magnetic north or a projection of a viewing direction of a camera of the device onto a plane perpendicular to gravity. The device further includes means for setting an origin of the reference coordinate system. The means for setting the origin comprise: means for obtaining a point cloud; and means for determining a geometric center of a substantially planar portion of the point cloud. The means for setting the origin comprise: means for obtaining a point cloud; and means for determining an intersection of a view direction of a camera of the device and a plane corresponding to a substantially planar portion of the point cloud.

Also or alternatively, implementations of the device may include one or more of the following features. The device further includes means for calculating a scale value. The means for calculating the scale value comprise: means for obtaining a point cloud; and means for comparing a dimension of the point cloud to a fixed size. The means for calculating the scale value comprise means for calculating the scale value such that an origin of the reference coordinate system will have a predetermined distance from the device. The means for calculating the scale value comprise means for using absolute measurements from one or more input sensors of the device. The one or more input sensors comprise an accelerometer or a plurality of cameras.

An example mobile device includes: a sensor configured to determine a direction of gravity and to provide an indication of the direction of gravity relative to the mobile device; and an orientation module communicatively coupled to the sensor and configured to convert an orientation of a device coordinate system, of the mobile device, using the indication of the direction of gravity relative to the device to produce a reference coordinate system.

Implementations of such a mobile device may include one or more of the following features. The orientation module is further configured to convert the orientation of the device coordinate system using a direction perpendicular to gravity. The mobile device further includes an origin module communicatively coupled to the orientation module and configured to set an origin of the reference coordinate system by obtaining a point cloud and at least one of: determining a geometric center of a substantially planar portion of the point cloud; or determining an intersection of a view direction of a camera of the mobile device and a plane corresponding to a substantially planar portion of the point cloud. The mobile device further includes a scale module communicatively coupled to the orientation module and configured to set a scale value for the reference coordinate system relative to the device coordinate system by: (1) obtaining a point cloud and comparing a dimension of the point cloud to a fixed size; or (2) calculating the scale value such that an origin of the reference coordinate system will have a predetermined distance from the mobile device; or (3) using absolute measurements from one or more input sensors of the mobile device. The orientation module is configured to produce a refined reference coordinate system using information from the reference coordinate system and at least one previously determined coordinate system.

An example processor-readable storage medium of a mobile device includes processor-readable instructions configured to cause a processor to: obtain an indication of a direction of gravity relative to the mobile device; and convert an orientation of a device coordinate system, of the mobile device, using the indication of the direction of gravity relative to the device to produce a reference coordinate system.

Implementations of such a storage medium may include one or more of the following features. The instructions configured to cause the processor to convert the orientation of the device coordinate system include instructions configured to use a direction perpendicular to gravity. The storage medium further includes instructions configured to cause the processor to set an origin of the reference coordinate system are configured to cause the processor to obtain a point cloud and at least one of: determine a geometric center of a substantially planar portion of the point cloud; or determine an intersection of a view direction of a camera of the mobile device and a plane corresponding to a substantially planar portion of the point cloud. The storage medium further includes instructions configured to cause the processor to set a scale value for the reference coordinate system relative to the device coordinate system by: (1) obtaining a point cloud and comparing a dimension of the point cloud to a fixed size; or (2) calculating the scale value such that an origin of the reference coordinate system will have a predetermined distance from the mobile device; or (3) using absolute measurements from one or more input sensors of the mobile device. The storage medium further includes instructions configured to cause the processor to produce a refined reference coordinate system using information from the reference coordinate system and at least one previously determined coordinate system.

Items and/or techniques described herein may provide one or more of the following capabilities, as well as other capabilities not mentioned. Meaningful ways are provided to define a coordinate system for augmented reality applications. For example, in a board game augmented reality application, a coordinate axis may be aligned parallel to the ground or another surface such as a table, and in a graffiti augmented reality application a coordinate axis may be aligned perpendicular to the ground, for example parallel to a wall or other structure. Coordinate systems may be provided where there is a known object in view or no known object in view. For cases with one or more objects in view, a more meaningful coordinate system may be established compared to prior techniques. For example, with multiple targets in view, the targets may be tracked and a coordinate system established. Alternatively, with multiple targets in view, a coordinate system may be aligned with an object, but not one of the tracked targets, thus providing a global coordinate system for all the targets. Other capabilities may be provided and not every implementation according to the disclosure must provide any particular capability, let alone all of the capabilities, discussed. Further, it may be possible for an effect noted above to be achieved by means other than that noted, and a noted item/technique may not necessarily yield the noted effect.

DETAILED DESCRIPTION

Techniques are provided to define an origin and/or an orientation, and optionally a scale, of a coordinate system. The coordinate system may be for a simultaneous localization and mapping system. The techniques may be used in a variety of situations, but at least some of the techniques may be particularly useful in situations where the origin and orientation are not given a priori by a known reference.

Techniques are provided for defining a reference coordinate system, e.g., for a simultaneous localization and mapping (SLAM) system, e.g., for augmented reality (AR) applications. Techniques are provided for determining the origin and/or orientation, and optionally the scale, of a coordinate system. For example, a device such as a mobile device may use as inputs a camera pose (position and orientation), a point cloud, and sensor data (e.g., measured from inertial sensors such as an accelerometer and a magnetometer). Using these inputs, the mobile device can determine a three-dimensional point in space for the origin of the desired coordinate system, an orientation of the desired coordinate system (e.g., three orthogonal axes), and a scale.

The mobile device can use this information to determine a translation from a coordinate system of the camera to the desired coordinate system.

Selecting a meaningful origin, orientation (and scale) for the coordinate system may be independent tasks. Different techniques are provided for each of these tasks. Some techniques make use of a three-dimensional (3D) point cloud. Some techniques use sensors. The defined coordinate system may be refined over time. Different techniques for determining the origin and/or different techniques for determining the orientation for the coordinate system may be used, e.g., depending on a particular application used.

Figure 1:
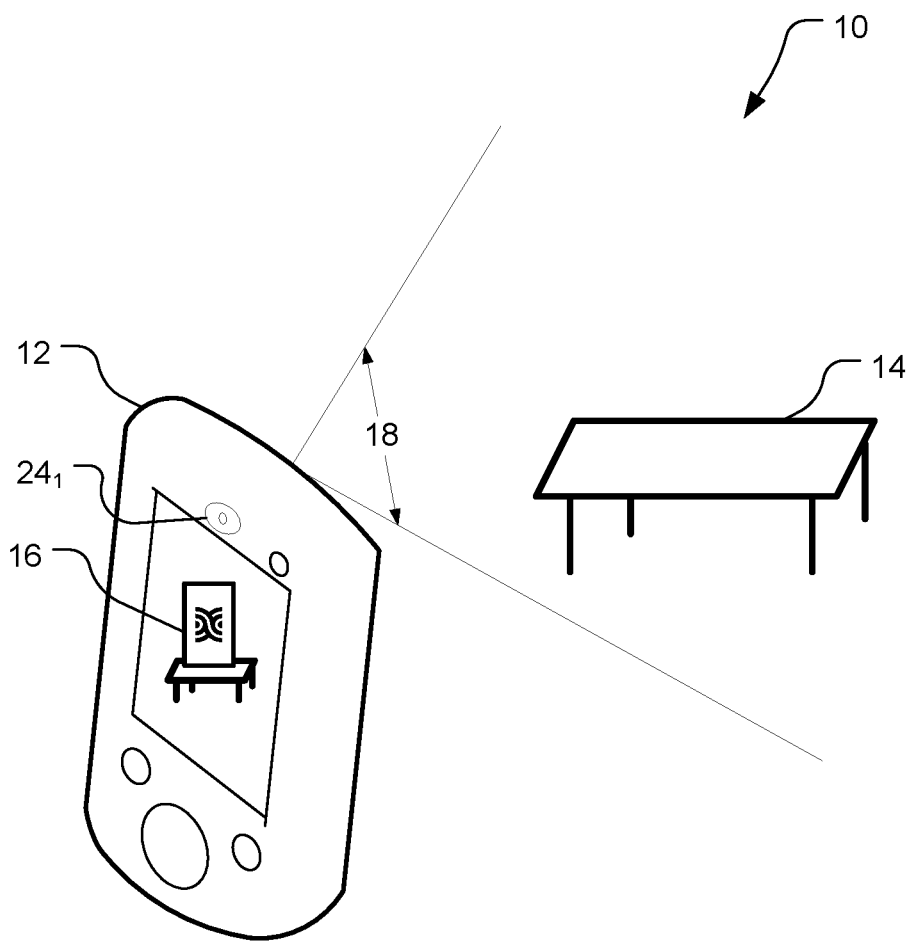
FIG. 1 is a simplified perspective view of an augmented reality system.

Referring to FIG. 1, a system for determining a coordinate system, here an augmented reality (AR) system 10 which may comprise a SLAM system, includes a device, here an AR-enabled mobile device 12, and an object 14. The mobile device 12 may be any computing device with an input sensory unit, such as a camera, and a display. Here, the mobile device 12 is a smart phone although the functionality described herein is not limited to smart phones. For example, the mobile device 12 may be a digital camera, a camcorder, a tablet computer, a personal digital assistant, a video game console, an HMD or other wearable display, a projector device, or other device. Further, instead of the mobile device 12, a device such as a personal computer (e.g., desktop computer), or other non-hand-held device or device not typically labeled a mobile device, could be used. The mobile device 12 includes a camera for capturing images of objects, here the object 14, in a field of view 18 of the camera. As used herein, a point cloud is a collection of points in three-dimensional space corresponding to at least a portion of an object, here the object 14, that is visible in the field of view 18 by the camera of the mobile device 12. The point cloud may be determined by one or more techniques performed by a processor of the mobile device 12, for example based on image data from a camera 24 (described below) of the mobile device 12 The mobile device 12 is configured to augment reality by capturing images of its environment, here capturing images of the object 14, and displaying the additional imagery on a transparent or semi-transparent display through which the object 14 is visible or displaying an image of the object 14 supplemented with additional imagery, here a drawing 16 partially superimposed on and partially disposed above the object 14, e.g., here for use in a graffiti AR application.

Figure 2:
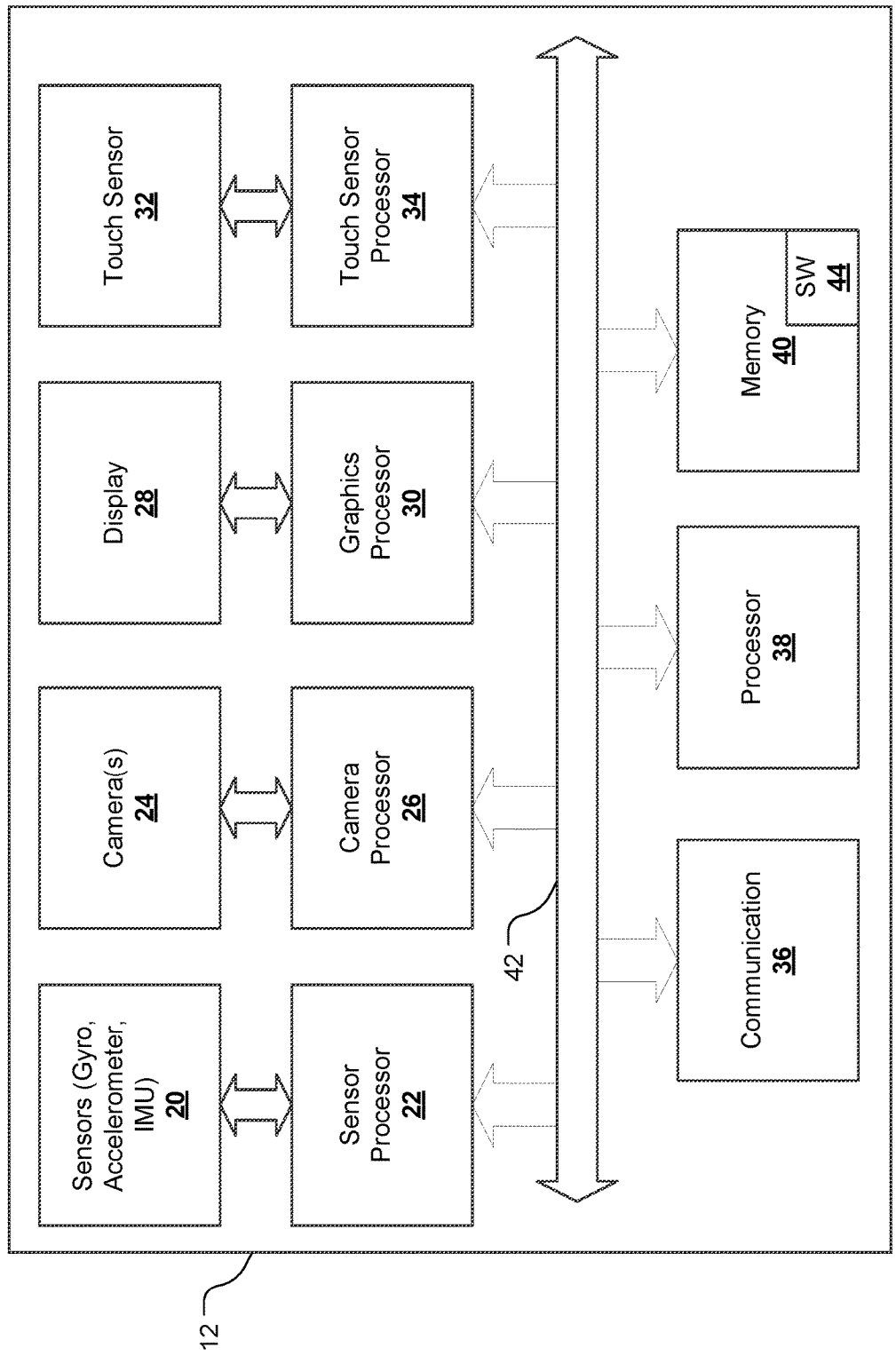
FIG. 2 is a block diagram of a computer system that incorporates components of a mobile device shown in FIG. 1.

Referring to FIG. 2, the mobile device 12 includes sensors 20, a sensor processor 22, one or more cameras 24, a camera processor 26, a display 28, a graphics processor 30, a touch sensor 32, a touch sensor processor 34, a communication module 36, a processor 38, and memory 40. The processors 22, 26, 30, 34, the communication module 36, the processor 38, and the memory 40 are communicatively coupled through a bus 42, as illustrated, or may be directly coupled or coupled in another way. The processors 22, 26, 30, 34 may be portions of a single processor, or implemented by different portions of software code stored in the memory 40 and executed by the processor 38, or separate dedicated processors, or combinations of these (e.g., with one or more of the processors 22, 26, 30, 34 being a dedicated processor or processors and others being part of the processor 38). The processors 22, 26, 30, 34, 38 may be one or more general-purpose processors and/or one or more special-purpose processors (such as digital signal processing chips, graphics acceleration processors, and/or the like). The sensors 20 can provide an indication and/or indications of various sensed parameters, e.g., an indication of a direction of gravity, e.g., relative to an orientation of the mobile device 12 (relative to a device coordinate system of the mobile device 12).

The sensors 20 and the sensor processor 22 are configured to determine an orientation of the mobile device 12. The sensors 20 are orientation sensors configured to sense information for use in determining an orientation of the mobile device 12. For example, the sensors 20 may include one or more inertial sensors such as gyroscopes, one or more accelerometers, an inertial measurement unit (IMU), and/or another type and/or other types of sensors. The sensor processor 22 is configured to process data measured/collected by the sensors 20 to determine the orientation of the mobile device 12.

The camera(s) 24 and the camera processor 26 are configured to capture and produce visual information. The camera(s) 24 is (are) configured to capture images and/or video of a real-world scene that can be augmented (with augmentation, e.g., text or designs placed on a real-world surface) using augmentation logic. The camera processor 26 is configured to process the data collected by the camera(s) 26 to convert the data into a format that can be used by the augmentation logic. The camera processor 26 is configured to perform various types of image or video processing on the data collected from the camera(s) 24 to prepare the content for display on display 28.

The display 28 and the graphics processor 30 are configured to provide visual information based on the data captured by the camera(s) 24 and processed by the camera processor 26, and to provide visual information based on information produced by the augmentation logic. The display 28 can be a touch screen interface that includes the touch sensor 32. The graphics processor 30 is configured to generate graphical data for display on the display 28. The graphics processor 30 is configured to use information provided by the augmentation logic to display augmented image or video content.

The touch sensor processor 34 can process data output by the touch sensor 32 to identify when a user touches the touch screen. The touch sensor process 34 can be configured to identify various touch gestures, including multi-finger touches of the touch screen. The augmentation logic can use the gesture information determined by the touch sensor processor 34 to determine, at least in part, how the augmentation should react in response to user input.

The communication module 36 is configured to enable the mobile device 12 to communicate using one more wireless protocols. The communication module 36 is configured to allow the mobile device 12 to send and receive data from nearby wireless devices, including wireless access points and other AR-enabled devices. The communication module 36 may include a modem, a wireless network card, an infrared communication device, a wireless communication device and/or chipset (such as a short-range wireless device such as a Bluetooth™ device, or an 802.11 device, a WiFi device, a WiMax device, cellular communication facilities, etc.), or the like. The communication module 36 may permit data to be exchanged with a network, other computer systems, and/or other devices.

The processor 38 is configured to control one or more of the sensor processor 22, the camera processor 26, the graphics processor 30, or the touch sensor processor 34. One or more of the sensor processor 22, camera processor 26, the graphics processor 30, or the touch sensor processor 34 may also be implemented by the processor 38.

The memory 40 includes volatile and/or persistent, non-transitory memory for storing data used by various components of the AR-enabled mobile device 12. The memory 40 may include local and/or network accessible storage, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The memory 40 stores processor-readable, processor-executable software program code 44 for one or more of the processors included in the mobile device 12. The software code 44 contains instructions for controlling the processor(s) to perform functions described below (although the description may read that the software or a processor performs the function(s)). In some instances, augmentation logic can be implemented as processor-executable instructions stored in the memory 40. The software 44 includes an operating system, device drivers, executable libraries, and/or other software code instructions, such as one or more application programs, that may implement methods described herein. For example, one or more procedures described herein might be implemented as software code instructions executed by a processor. Such instructions can cause a general purpose computer (or other device) to perform one or more operations as described herein. The software 44 may be stored on a non-removable portion of the memory 40 incorporated within the mobile device 12 or may be stored on a removable medium, such as a compact disc, and/or provided in an installation package. The instructions may take the form of executable code, which is directly executable by a processor, or alternatively the instructions may take the form of source and/or installable code, which, upon compilation and/or installation (e.g., using any of a variety of generally available compilers, installation programs, compression/decompression utilities, etc.) then takes the form of executable code. One or more of the elements described above with respect to the mobile device 12 may be omitted. For example, the communication module 36 and/or the touch sensor 32 and touch sensor processor 34 may be omitted. Further, additional elements may be included in some embodiments. One or more of the processors 22, 26, 30, 34 may be combined with, or implemented in, the processor 38, and/or some or all functionality of one or more of the processors 22, 26, 30, 34 may be implemented by instructions stored in the memory 40.

Figure 3:
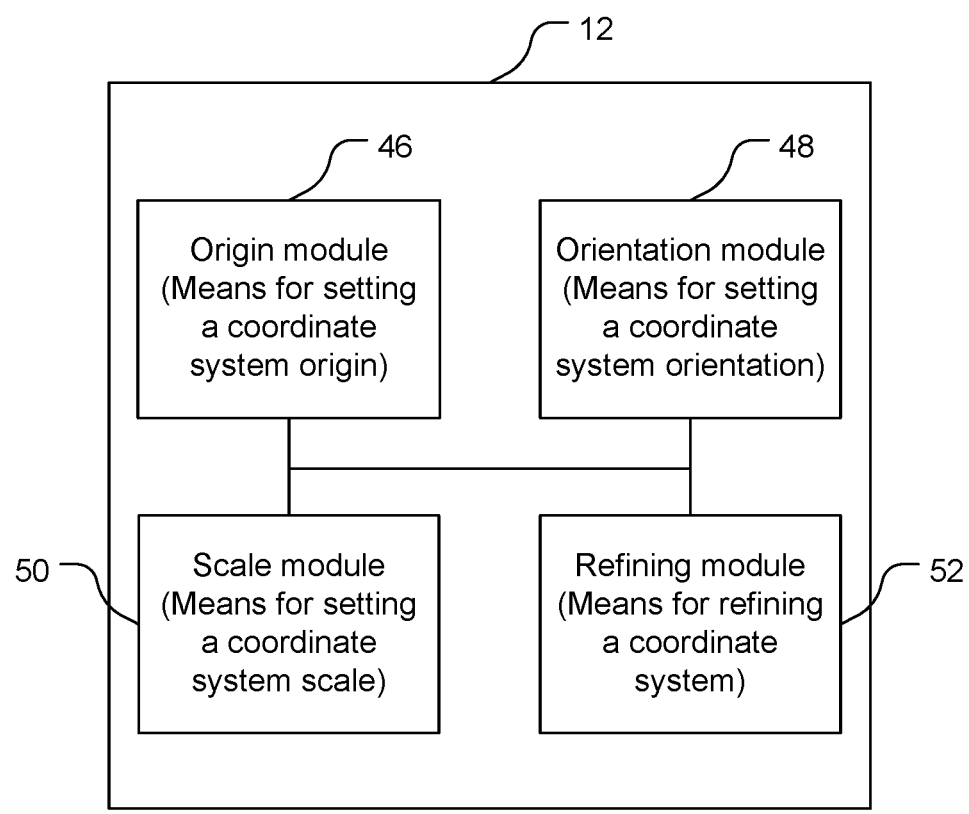
FIG. 3 is a functional block diagram of the computer system shown in FIG. 2.

Referring to FIG. 3, the mobile device 12 includes an origin module (means for setting a coordinate system origin) 46, an orientation module (orientation means or means for setting a coordinate system orientation) 48, a scale module (means for setting a coordinate system scale) 50, and a refining module (means for refining a coordinate system) 52. The origin module 46, the orientation module 48, the scale module 50, and the refining module 52 are communicatively coupled to each other. The modules 46, 48, 50, 52 are functional modules that may be implemented by the processors 22, 26, 38 and/or the software 44 stored in the memory 40, although the modules 46, 48, 50, 52 could be implemented in hardware, firmware, or software, or combinations of these. Reference to the modules 46, 48, 50, 52 performing or being configured to perform a function is shorthand for one or more of the processors 22, 26, 38 performing or being configured to perform the function in accordance with the software 44 (and/or firmware, and/or hardware of the processors 22, 26, 38). Similarly, reference to one or more of the processors 22, 26, 38 determining an origin of a coordinate system, or determining an orientation of a coordinate system, or setting a scale of a coordinate system is equivalent to the origin module 46, or the orientation module 48, or the scale module 50, respectively, performing the function. The origin module 46, or means for setting a coordinate system origin, is configured to set an origin of a coordinate system, e.g., an AR coordinate system based on information captured by the camera(s) 24. Examples of operation of the origin module 46 are discussed below with respect to FIG. 6, although the origin module 46 may operate in one or more other ways as well. The orientation module 48, or means for setting a coordinate system orientation, is configured to set an orientation of a coordinate system, e.g., an AR coordinate system using information captured by the camera(s) 24 and/or information obtained from the sensor(s) 22. The orientation module 48, or means for setting a coordinate system orientation, include converting means for converting an orientation of a device coordinate system of the mobile device 12 to the orientation of a reference coordinate system. Examples of operation of the orientation module 48 are discussed below with respect to FIG. 6, although the orientation module 48 may operate in one or more other ways as well. The scale module 50 is configured to set (including determine) a scale value for a coordinate system, e.g., an AR coordinate system, using techniques discussed below or other appropriate techniques. The refining module 52 is configured to use previously-determined information, e.g., origin and/or orientation and/or scale value, to refine the reference coordinate system, e.g., change the origin and/or orientation and/or scale value of the reference coordinate system.

The modules 46, 48, 50, 52 are configured to establish a reference coordinate system to enhance performance of the device 12. For example, with the reference coordinate system being an AR coordinate system, the modules 46, 48, 50, 52 help with the provision of AR images so that the AR images comport with user expectations, e.g., so that a gaming experience is more realistic and/or believable. As further examples, the modules 46, 48, 50, 52 can help ensure that a painting application provides a vertical easel, a board-game application provides a horizontal gameboard, a sports application is coordinated with sports equipment (e.g., a basketball hoop) in view of the camera 24, etc. Use of these modules may cause AR images to appear to displayed by the device 12 as an appropriate size, in an expected orientation, and/or in a proper augmentation with respect to a surface, for example to appear to be walking on or anchored to a surface instead of floating above it. Further, these modules may be used to establish a reference system by the device 12 for uses other than AR, for example in other applications where tracking and/or mapping is utilized, such as in a different type of SLAM system.

Figure 4:
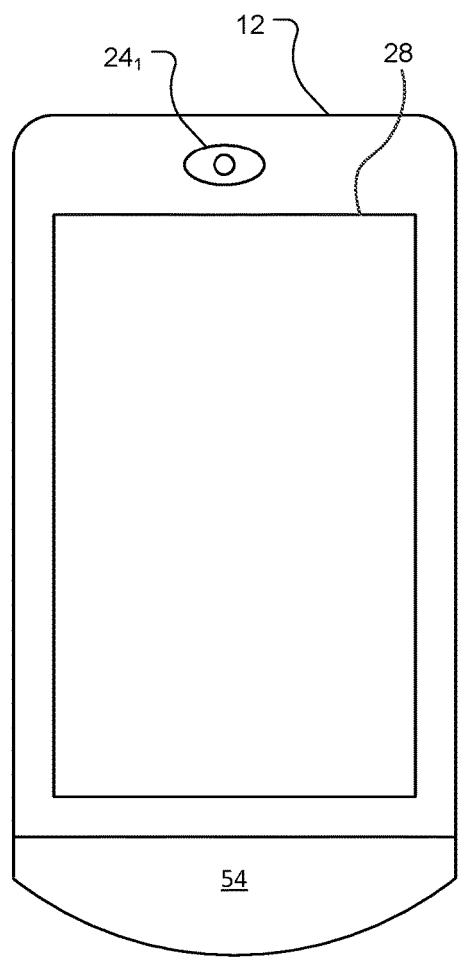
FIGS. 4-5 are simplified plan views of the mobile device shown in FIG. 1.
Figure 5:
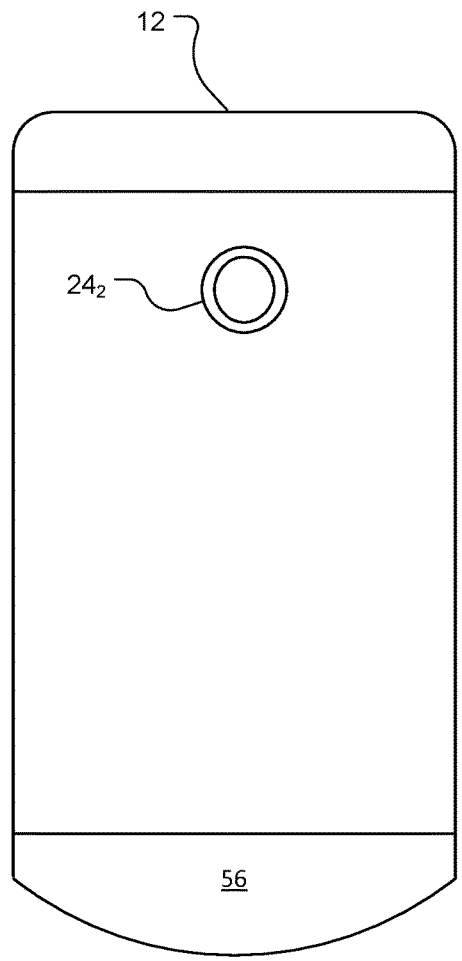

Referring to FIGS. 4-5, the mobile device 12 may include two cameras $24_1$, $24_2$ in at least some configurations. The camera $24_1$ is disposed on a front side 54 of the mobile device 12, along with the display 28, and the camera $24_2$ is disposed on a back side or rear side 56 of the mobile device 12. The camera $24_1$ is referred to as a front-facing camera and the camera $24_2$ is referred to herein as a rear-facing camera. The mobile device 12 is typically held such that the front-facing camera $24_1$ faces a user of the mobile device 12 and the rear-facing camera $24_2$ faces away from the user of the mobile device 12. Alternatively, the converse may be true depending on how the mobile device 12 is held by the user. Referring also to FIG. 1, either of the cameras $24_1$ $24_2$ may have the field of view (FOV) 18. The camera $24_2$ is described below as having the FOV 18, but the camera $24_1$ or another camera may have the FOV 18 in other situations or implementations.

Figure 6:
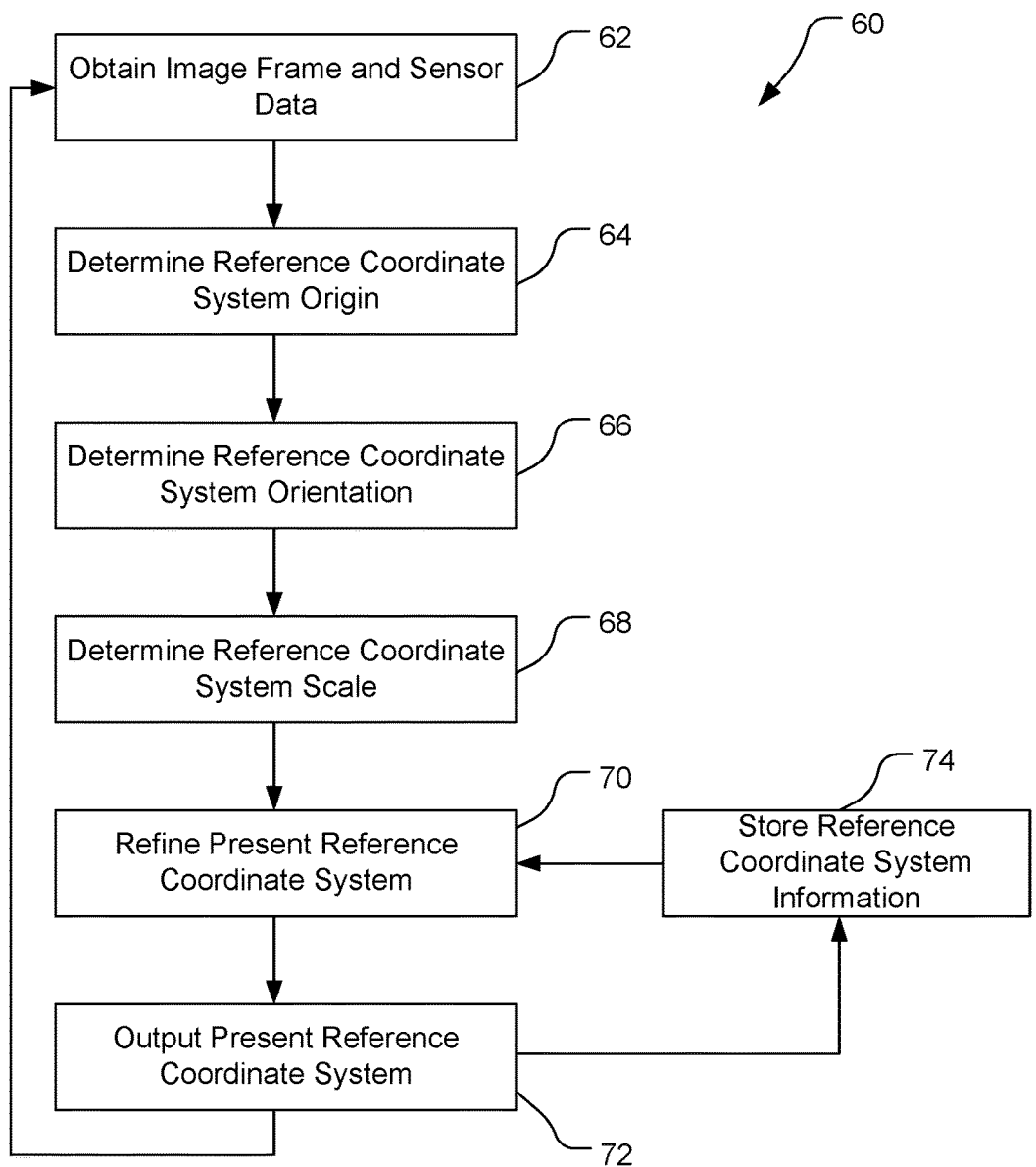
FIG. 6 is a block flow diagram of a process of calculating a reference coordinate system.

Referring to FIG. 6, with further reference to FIGS. 1-5, a process 60 of establishing a reference coordinate system includes the stages shown. The process 60 is, however, an example only and not limiting. The process 60 can be altered, e.g., by having stages added, removed, rearranged, combined, and/or performed concurrently. For example, stages 70 and 74 discussed below could be eliminated, or two or more of the stages 64, 66, 68 could be performed in a different order than illustrated. The reference coordinate system may be a SLAM coordinate system such as an AR coordinate system.

At stage 62, the mobile device 12 obtains an image frame and in some embodiments also obtains sensor data. At a triggering event such as at power up, activation of an AR application, user selection, or other triggering event, the mobile device 12 captures an image from one of the cameras 24, e.g., the rear-facing camera $24_2$, as processed by the camera processor 26. The mobile device 12 may further obtain information from the sensors 20 as processed by the sensor processor 22. In this example, using an accelerometer, the mobile device 12 obtains information regarding the direction of gravity relative to the coordinate system of the mobile device 12. Further, using an accelerometer and a magnetometer, the mobile device 12 obtains the direction of magnetic north relative to the coordinate system of the mobile device 12. In some embodiments, two non-linear vectors are used. The two non-linear vectors may comprise a gravity vector (pointed downward) and a vector of magnetic north (pointed toward magnetic north), or a combination of one of these vectors and another vector, or a combination of two other non-linear vectors. The gravity vector and the vector of magnetic north (i.e., a magnetic north vector) may both be derived from one or more accelerometer measurements.

Figure 7:
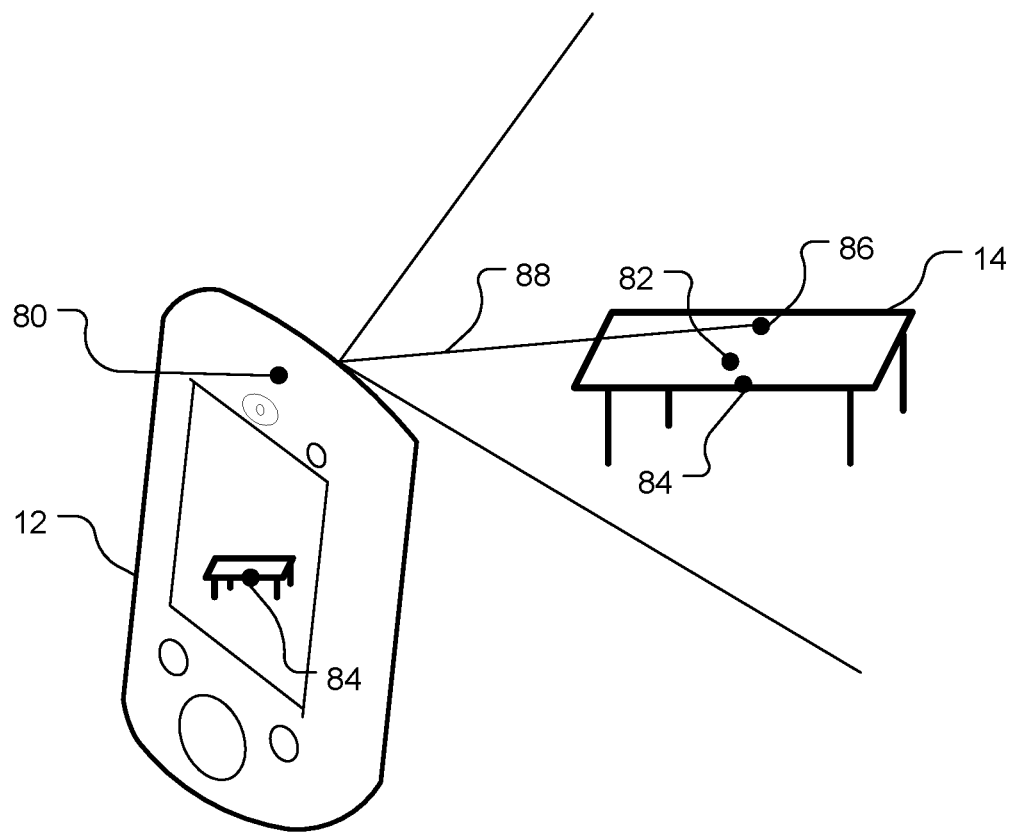
FIG. 7 is a perspective view of the system shown in FIG. 1 showing techniques for setting an origin of the reference coordinate system.

At stage 64, the mobile device 12 determines the reference coordinate system origin. The origin module 46 may set the origin in one of a variety of ways depending upon the circumstances. In a first technique, the origin module 46 sets the origin at a present 3D position 80 of the camera $24_2$ as shown in FIG. 7. In a second technique, the origin module 46 sets the origin 82 at a geometric center associated with a point cloud, e.g. a geometric center of the object 14 as shown in FIG. 7. This technique may be used, for example, when the point cloud is known or determined to have a planar surface (e.g., a table, a poster on a wall, etc.). The geometric center associated with the point cloud may be determined as the geometric center of the planar surface. In a third technique, the origin module 46 sets the origin 84 at a point of the point cloud whose two-dimensional (2D) projection lies close to a center of the camera image as shown in FIG. 7. This technique affixes or assigns the origin to a physical object, because any point of the point cloud corresponds to a physical structure in the environment (around the mobile device 12). This technique may be used in various situations, but may be particularly useful where variance in the depth in the physical environment is small, with the points of the point cloud being at similar distances from the camera 24. In a fourth technique, the origin module 46 sets the origin 86 of the reference coordinate system at an intersection between the camera view direction 88 (i.e., a ray through the center of the camera frame, i.e., in the center of the field of view of the camera 24) and a plane fit to the point cloud. The plane can be fit to a large or small portion of the point cloud depending upon whether the point cloud is planar (represents a planar surface) or does not represent a substantial planar surface. For example, the origin module 46 can fit the plane to some points of the point cloud whose 2D projections lie close to the camera center. This technique helps ensure that the origin will be at or near the center of the camera's view and also associated with a physical geometry in the environment around the mobile device 12. As shown in FIG. 7, the origins 82, 84, 86 are in different locations but close to each other. This is an example only, and in other examples, one or more of the origins 82, 84, 86 may be co-located, and/or one or more of the origins 82, 84, 86 may be displaced from one or more of the other origins 82, 84, 86 further or lesser than shown.

Figure 8:
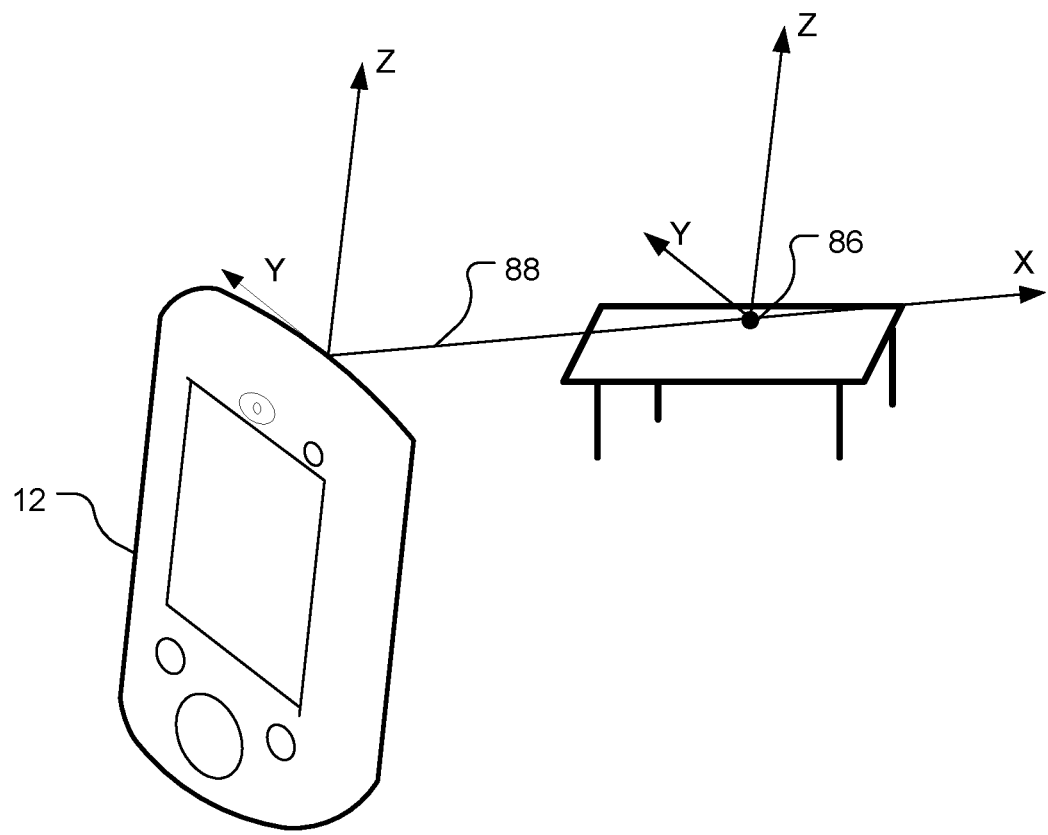
FIGS. 8-10 are perspective view of the system shown in FIG. 1 showing techniques for setting an orientation of the reference coordinate system.
Figure 9:
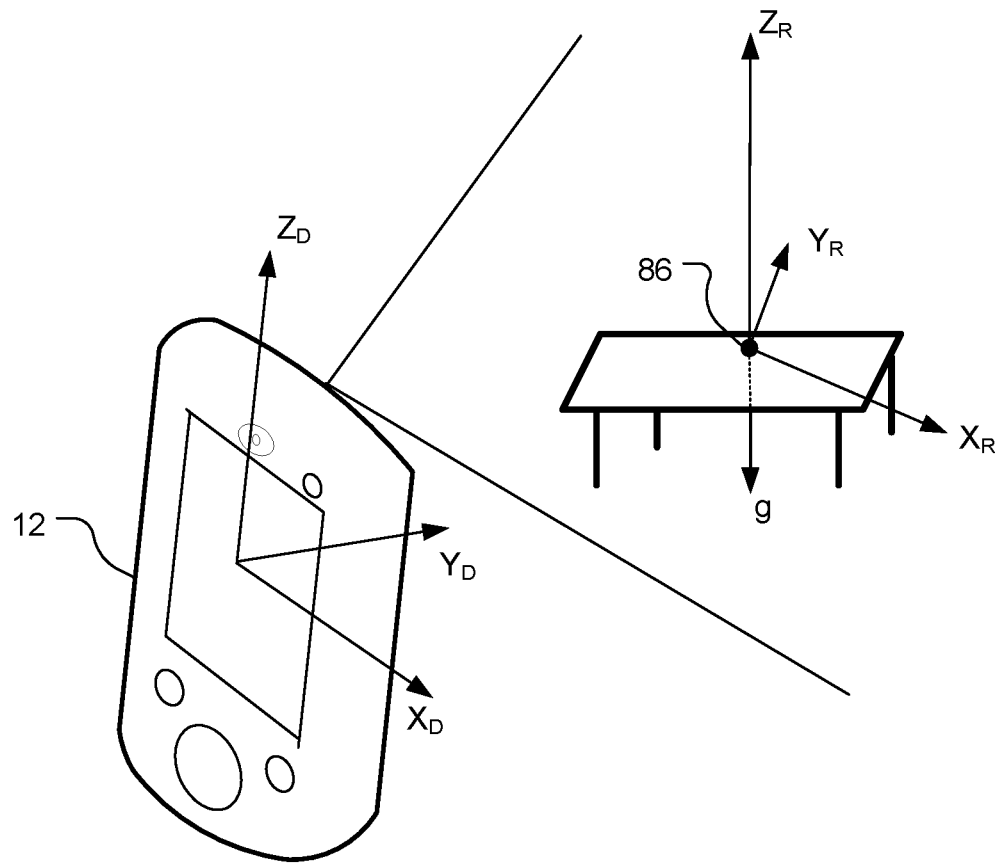
Figure 10:
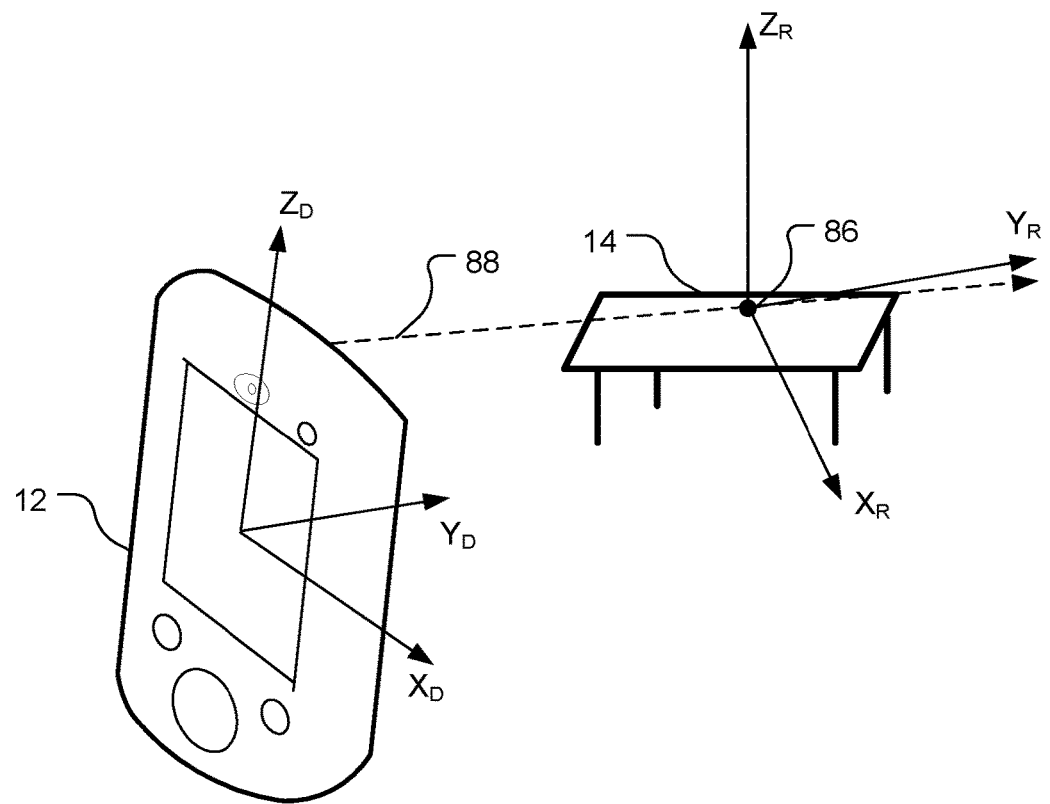

At stage 66, the mobile device 12 determines the reference coordinate system orientation, for example using two non-parallel vectors. The orientation of the reference coordinate system defines the directions for elevation (up/down, +/−z-direction), azimuth (left/right, +/−x-direction), and forward/backward (+/−y-direction), assuming an x-y-z orthogonal coordinate system. Because the reference coordinate system is orthogonal, it is enough for the orientation module 48 to define the z-axis and the y-axis, with the final axis resulting from the orthogonality between the axes (and sidedness such as right-handedness). In some techniques, a different combination of two axes is used. Several techniques are available for determining the orientation. In a first technique, the orientation module 48 sets the orientation of the reference coordinate system as the orientation of the present camera image frame, as shown in FIG. 8. This technique, as shown in FIG. 8, is applied to the origin 86, but the technique could be applied to any origin, selected using any technique. This technique is independent of sensor measurements and can be used when the sensor information is not available (e.g., the sensors 20 are inoperative or it is desirable to conserve power). The resulting reference coordinate system will be oriented without regard to gravity and may be askew relative to the physical environment (e.g., with azimuth being non-parallel to the floor). In a second technique, as shown in FIG. 9, the orientation module 48 sets the orientation with respect to gravity (shown as vector g) and to a direction perpendicular to gravity or within a tolerance, e.g., 10°, of perpendicular to gravity (i.e., substantially horizontal orientation with respect to Earth or a surface of Earth), such as magnetic north (or, alternatively, true north). The orientation module 48 may use information from the sensor processor 22 to set the positive z-axis ($Z_R$) of the reference coordinate system as the inverse direction of gravity or within a tolerance, e.g., 10°, of this direction (i.e., substantially vertical orientation with respect to Earth or a surface of Earth) based on information from the accelerometer, and set the positive y-axis ($Y_R$) of the reference coordinate system as the direction of magnetic north (based on information from the magnetometer and/or accelerometer). This technique may be used in various situations, and may be particularly useful in situations where alignment with geographic directions (e.g., for a navigation system) is useful or important. In a third technique, as shown in FIG. 10, the orientation module 48 sets the orientation of the reference coordinate system with respect to gravity and a present view direction of the camera 24. For example, the orientation module 48 sets the positive z-axis as the inverse direction of gravity (using the accelerometer) and sets the positive y-axis as the current view direction of the rear-facing camera $24_2$, projected onto a plane perpendicular to the z-axis (here the top surface of the table 14). This technique may be used in various situations, and may be particularly useful in situations where alignment with geographic directions is of little or no importance or use and alignment with the camera viewing direction is useful or important.

Figure 11:
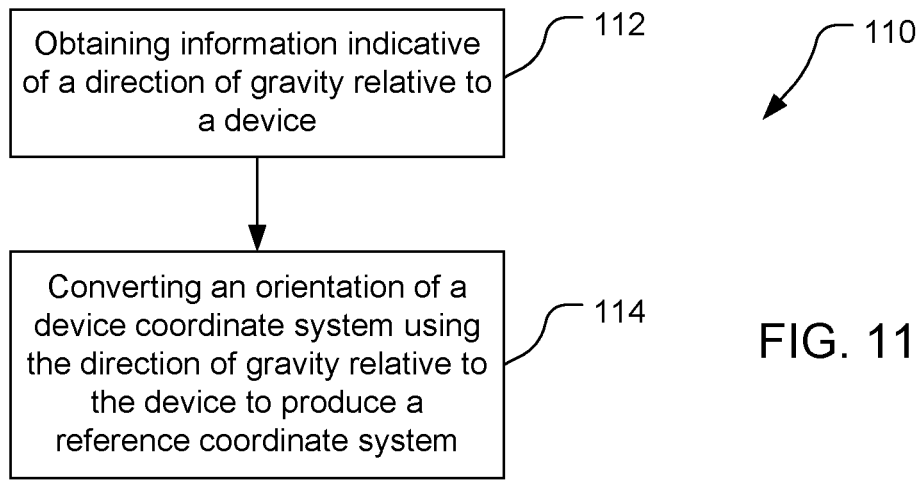
FIGS. 11-13 are block flow diagrams of processes for determining reference coordinate systems.

Referring also to FIG. 11, a process 110 of determining a reference coordinate system using a direction of gravity includes the stages shown. The process 110 is, however, an example only and not limiting. The process 110 can be altered, e.g., by having stages added, removed, rearranged, combined, and/or performed concurrently. While x-y-z coordinate systems are discussed below, other coordinate systems could be used. The process 110 includes techniques shown in both FIG. 9 and FIG. 10 and discussed above for orienting a reference coordinate system.

At stage 112, the process 110 includes obtaining information indicative of a direction of gravity relative to a device. The orientation module 48 obtains information regarding a direction of gravity from the sensor processor 22, that the sensor processor 22 computed from sensor data from one or more of the sensors 20. The information from the sensor processor 22 regarding the direction of gravity may be relative to the device 12, e.g., relative to a device coordinate system ($X_D$-$Y_D$-$Z_D$) or may be converted by the orientation module 48 to be relative to the device coordinate system.

At stage 114, the process 110 includes converting an orientation of the device coordinate system ($X_D$-$Y_D$-$Z_D$) using the direction of gravity relative to the device to produce the reference coordinate system ($X_R$-$Y_R$-$Z_R$). Known techniques can be used to convert (translate the origin and/or rotate the orientation) of the device coordinate system to yield the reference coordinate system. Translate is used here to indicate linear motion although the term translating (and its conjugations) was used in U.S. Provisional Application No. 61/722,023 to mean converting as used herein.

Figure 12:
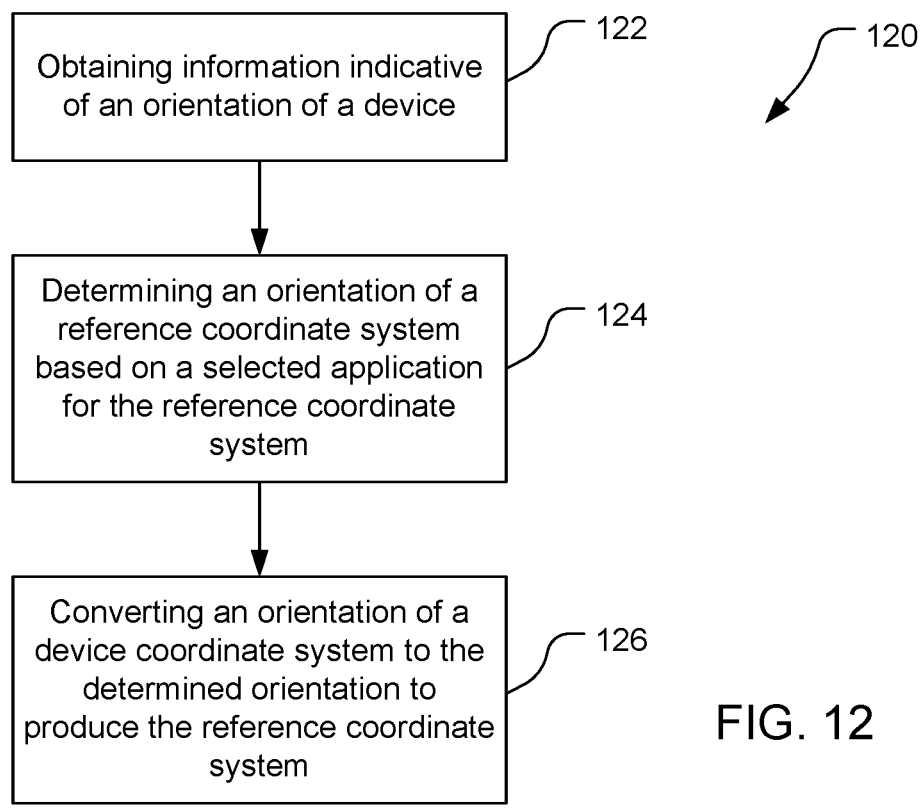

Referring further to FIG. 12, a process 120 of determining a reference coordinate system based on an application that will use the reference coordinate system includes the stages shown. The process 120 is, however, an example only and not limiting. The process 120 can be altered, e.g., by having stages added, removed, rearranged, combined, and/or performed concurrently. The process 120 includes techniques for orienting the reference coordinate system.

At stage 122, the process 120 includes obtaining information indicative of an orientation of a device. The orientation module 48 obtains information from the sensor processor 22, that the sensor processor 22 computed from sensor data from one or more of the sensors 20. The information indicates (either directly or after processing by the orientation module 48) an orientation of the device coordinate system, e.g., here the $X_D$-$Y_D$-$Z_D$ coordinate system shown in FIGS. 9-10.

At stage 124, the process 120 includes determining an orientation of the reference coordinate system based on a selected application for the reference coordinate system. The reference coordinate system may be initially defined and/or set to align with a surface determined or hypothesized by the mobile device 12, e.g., via an AR application executed on the mobile device 12, to be useful or important. For instance, two axes of an x-y-z coordinate system may be defined to lie in a plane of a surface of a table (e.g., a tabletop) for a gaming application, a wall for a graffiti application, or other surface or an arbitrary orientation, e.g., as discussed below with respect to provided examples. For example, the processor 38 can analyze information from one or more camera images to determine a plane of a point cloud and assign two axes to be orthogonal to each other and to lie in the plane, with the third axis being orthogonal to both of the other two axes. Determining the orientation of the reference coordinate system may comprise receiving the orientation of the reference coordinate system, e.g., from the AR application and/or from user input, and a means for determining the orientation may thus include means for receiving the orientation of the reference coordinate system, e.g., from the AR application and/or from user input. Also or alternatively, the orientation of the reference coordinate system may be determined based on a type of augmentation associated with the AR application. For example, the type of augmentation may comprise text and/or designs placed on a real-world surface, and/or a character moving on a real-world surface. Such augmentations could indicate a plane that should be occupied, e.g., by an x-y plane of the reference coordinate system.

The orientation module 48 may determine which technique or techniques to use to determine the orientation of the reference coordinate system based on the application. For example, the orientation module 48 may select one or more of the techniques discussed above with respect to stage 66 based on the application. If more than one technique is selected, then results may be combined, e.g., averaged (including weighted averaging or non-weighted averaging) to determine the reference coordinate system orientation if appropriate, or one of the techniques selected otherwise. The orientation module 48 may determine (or select) the orientation technique(s) based on one or more properties or benefits of the techniques relative to the application. For example, for a sports application (e.g., a basketball game), the orientation may be desirable to be relative to gravity while for a first person shooter game in a spaceship, the orientation may be desirable to be relative to the camera image frame at the start of the application. The benefit(s) and/or property(ies) of the application can be matched to the orientation technique, e.g., by analysis by the orientation module 48, by user input, by predetermined settings (e.g., by an application developer), etc. If more than one technique is selected, then results may be combined, e.g., averaged (including weighted averaging or non-weighted averaging) to determine the reference coordinate system orientation if appropriate, or one of the techniques selected otherwise. That is, in situations where multiple orientation techniques would each be desirable, the orientation module 48 may combine the orientations if practical, or may select one of the techniques based on a priority for the particular application (e.g., as predefined), or may allow a user to select the orientation technique, etc.

At stage 126, the process 120 includes converting an orientation of a device coordinate system to the determined orientation to produce the reference coordinate system. The orientation module 48 converts the orientation of the device coordinate system to the orientation of the determined orientation from stage 124 to produce the reference coordinate system, e.g., using known techniques to rotate the device coordinate system to the determined orientation.

Further, the process 120 may include stages for obtaining information indicative of an initial origin, determining a desired origin of the reference coordinate system, and converting the initial origin to the desired origin as the origin of the reference coordinate system. These stages may be done as part of the process 120, or as a separate process, independent of the process 120. The origin module 46 may determine which technique or techniques to use to determine the origin of the reference coordinate system based on the application. For example, the origin module 46 may select one or more of the techniques discussed above with respect to stage 64 based on the application. The origin module 46 may determine (or select) the origin technique(s) based on one or more properties or benefits of the techniques relative to the application. For example, for a sports application (e.g., a basketball game), the origin may be desirable to be associated with sports equipment, e.g., a basketball basket, for a painting application, the origin may be desirable to be a center of a planar surface such as a wall or a canvas on an easel, while for a guidance application the origin may be desirable to be the origin of the camera 24. The benefit(s) and/or property(ies) of the application can be matched to the origin technique, e.g., by analysis by the origin module 46, by user input, by predetermined settings (e.g., by an application developer), etc. If more than one technique is selected, then results may be combined, e.g., averaged (including weighted averaging or non-weighted averaging) to determine the reference coordinate system origin if appropriate, or one of the techniques selected otherwise. That is, in situations where multiple origin techniques would each be desirable, the origin module 46 may combine the origins if practical, or may select one of the techniques based on a priority for the particular application (e.g., as predefined), or may allow a user to select the origin technique, etc.

Returning to FIG. 6, at stage 68, the mobile device 12 determines the scale of the reference coordinate system, although doing so is optional as a scale value may be predetermined. The scale value may be determined using a variety of techniques. In a first technique, the scale module 50 sets a scale value by comparing and scaling the point cloud to a fixed size, e.g., one unit. To do so, the scale module 50 may scale any of a variety of dimensions of the point cloud such as a height, a width, or a longest dimension seen from the camera 24. In a second technique, the scale module 50 sets the scale value such that the AR coordinate origin has a specific predetermined distance, e.g., one unit, to the present camera position, e.g., the origin of the camera coordinate system. In a third technique, the scale module 50 sets the scale value based on absolute measurements, e.g., as provided by an accelerometer or a stereo camera system (e.g., two rear-view cameras 24 displaced on the back 56 of the mobile device 12). The absolute measurements can be directly used to define the scale of the AR coordinate system. For example, a measurement such as 1 cm from the absolute measurements could be used as 1 unit in the AR coordinate system.

At stage 70, the mobile device 12 refines the present reference coordinate system determined in stages 64, 66, 68. The reference coordinate system may be refined over time such that the reference coordinate system can be improved (e.g., corrected if the initial hypothesis is incorrect). The mobile device 12 refines the present reference coordinate system (origin, orientation, and possibly scale) using information from a previously-determined reference coordinate system, here the most-recently determined reference coordinate system, if any. For example, the processor 38 may iterate the reference coordinate system, e.g., origin and/or orientation and/or scale, over time using a Kalman filter by using one or more of the values and/or sensor data from previous iterations. This stage is optional, as is the stage 74 discussed below.

At stage 72, the mobile device 12 outputs the present reference coordinate system. The present reference coordinate system may be output to an AR application such as a drawing application, a board game application, a first-person shooter application, etc. The present reference coordinate system may be a refined reference coordinate system if a prior reference coordinate system was available at stage 70 inducing modification to the system determined at stages 64, 66, 68 and will be an unrefined coordinate system if no prior reference coordinate system was available at stage 70 or if the prior reference coordinate system induces no modification to the system determined at stages 64, 66, 68.

At stage 74, the present reference coordinate system is stored. The present reference coordinate system is stored in the memory 40 for use as the prior reference coordinate system in stage 70. As with stage 70, stage 74 is optional.

The process 60 returns to stage 62 after stage 72. The process 60 continues until the mobile device 12 is powered down or the AR application being run on the mobile device 12 is closed. The process 60 can be initiated or repeated based on or in response to one or more of various criteria. For example, the process 60 could be performed in response to: each image being captured; a threshold number of images having been captured; an application request; a user request; passage of a threshold amount of time; determination of a threshold amount of drift in origin and/or orientation having occurred; etc.

Figure 13:
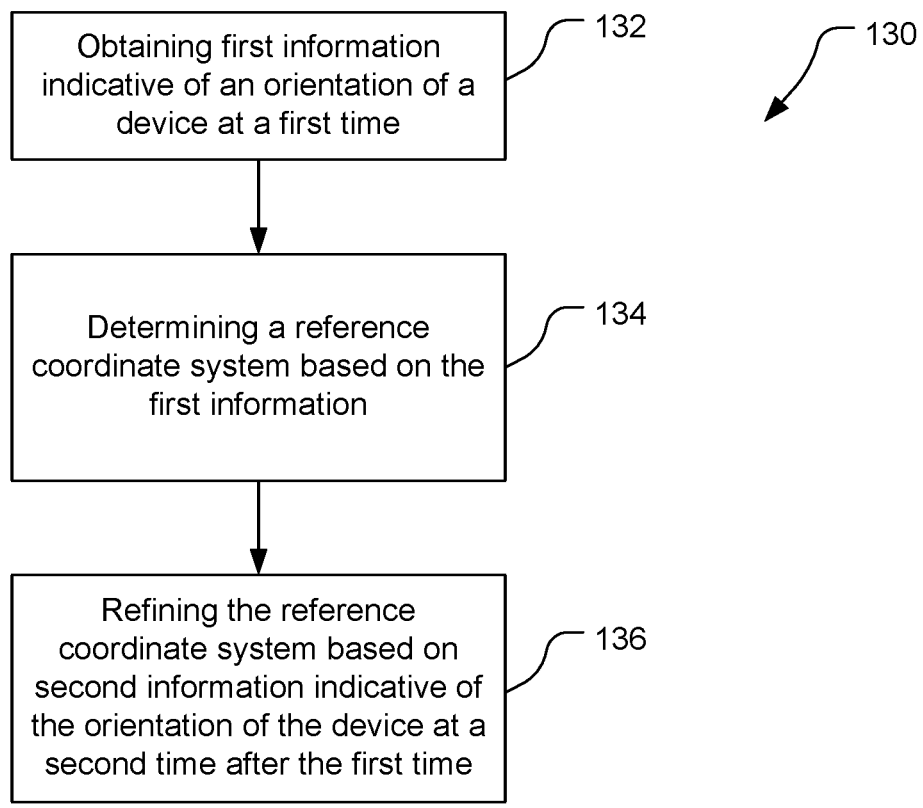

Referring to FIG. 13, a process 130 of determining a reference coordinate system by refining a determined reference coordinate system includes the stages shown. The process 130 is, however, an example only and not limiting. The process 130 can be altered, e.g., by having stages added, removed, rearranged, combined, and/or performed concurrently.

At stage 132, the process 130 includes obtaining first information indicative of an orientation of a device at a first time. The processor 38 may obtain the information from the sensor processor in accordance with measurements taken by the sensors 20, and/or may obtain the information from the memory 40, etc. For example, stage 132 may comprises stage 62 discussed above.

At stage 134, the process 130 includes determining the reference coordinate system based on the first information. The processor 38 determines the reference coordinate system, e.g., as discussed above with respect to stages 64, 66, and, optionally, stage 68.

At stage 136, the process 130 includes refining the reference coordinate system based on second information indicative of the orientation of the device at a second time after the first time (i.e., the second information is obtained, e.g., sensed, subsequently to the first information being obtained, e.g., sensed). For example, the processor 38 can refine the reference coordinate system as discussed above with respect to stage 70 using stored information regarding previously-determined reference coordinate system information associated with at least one previously-determined coordinate system. Movement of the mobile device 12 between the first time and the second time may improve the refinement.

EXAMPLES

The preferred choice of a reference coordinate system may be affected by the application for which the reference coordinate system is to be used. The origin module 46 and/or the orientation module 48 may select a technique or techniques for determining the origin and/or orientation of the reference coordinate system based on the application to be used. The following are examples of how the processor 38 can choose between various coordinate selection techniques for some applications, but other techniques for setting the coordinate system origins and/or coordinate system orientations may be used for the applications discussed or other applications.

In a game-board AR game, an example of a meaningful coordinate system is one that is upright and aligned with a horizontal surface, e.g., of a table. In this case, the processor

38 can assume that the point cloud is reasonably planar for calculating the origin of the reference coordinate system, e.g., using the first or fourth origin-setting techniques discussed above. The orientation of the reference coordinate system can be calculated by the processor 38 and/or the orientation module 48 with respect to gravity and to the view direction of the camera 24, e.g., using the third orientation-setting technique discussed above. Similarly, in a graffiti AR application, a meaningful coordinate system is typically aligned with a wall and facing the outer side of the wall. In this case, for example, the processor 38 can calculate the origin using the second or fourth origin-setting techniques discussed above, with the point cloud being substantially/reasonably planar (e.g., having a substantially planar portion, e.g., planar within an allowed tolerance, e.g., 10% deviation of height versus length or width of the plane). In this case, for example, the processor 38 can calculate the orientation of the reference coordinate system using the third orientation-setting technique discussed above and then rotating the coordinate system by 90 degrees around the x-axis so that the z-axis points horizontally out of the wall rather than upwards.

In an application with a robot navigating an unknown environment, an example of a meaningful coordinate system is one that is centered on the robot's initial position and aligned to gravity and to north. In this case, for example, the processor 38 and/or the origin module 46 may use the first origin-setting technique discussed above to calculate the origin of the reference coordinate system, and may use the second orientation-setting technique discussed above to orient the reference coordinate system correctly with respect to gravity and north. In some embodiments, such reference coordinate system may be used for SLAM, and the robot navigates the unknown environment using SLAM.

In a first-person shooting game in outer space, an example of a meaningful reference coordinate system is one that is aligned to the initial camera position and orientation, and that is independent of gravity. In this case, for example, the processor 38 may use the first origin-setting technique and the first orientation-setting technique discussed above.

Proper setting of a reference coordinate system may help improve a user experience. For example, proper setting of the reference coordinate system may help ensure that augmentations are in appropriate proportions (e.g., a basketball being smaller than basketball basket), in appropriate locations (e.g., heavy objects not floating in mid-air, fish not flying, etc.), and at appropriate orientations (e.g., people standing upright, cars driving horizontally, etc.).

Other Considerations

The discussion gave examples using x-y-z coordinate systems, the principles involved, and/or the specific techniques discussed with little modification, could be applied to other coordinate systems.

Other examples and implementations are within the scope and spirit of the disclosure and appended claims. For example, while the discussion above focused on augmented reality systems and/or SLAM systems, the techniques discussed may be applied to non-augmented reality systems. Further, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, the following are example claims regarding various aspects of the discussion above.

1. A method of determining a reference coordinate system, the method comprising:
   obtaining first information indicative of an orientation of a device at a first time;
   determining the reference coordinate system based on the first information; and
   refining the reference coordinate system based on second information indicative of the orientation of the device at a second time after the first time.

2. The method of claim 1 wherein the device has been moved between the first time and the second time.

3. The method of claim 1 wherein the reference coordinate system comprises a coordinate system for use with an application of the device, and wherein the determining comprises converting an orientation of a coordinate system of the device to the reference coordinate system for use with the application of the device.

4. The method of claim 3 wherein the reference coordinate system for use with an application of the device comprises a SLAM coordinate system.

5. The method of claim 3 wherein the application comprises an AR application.

6. The method of claim 1 wherein the first information comprises two non-linear vectors.

7. The method of claim 6, wherein a first of the two non-linear vectors comprises a gravity vector derived from one or more accelerometer measurements.

8. The method of claim 7 wherein a second of the two non-linear vectors comprises a vector pointed in a direction of magnetic north, the second of the two vectors being derived from at least a magnetometer, or wherein the second of the two non-linear vectors comprises a projection of a viewing direction of a camera of the device onto a plane perpendicular to gravity.

9. The method of claim 1 wherein the determining comprises setting an origin of the reference coordinate system and/or determining a scale value of the reference coordinate system.

10. A mobile device comprising:
    means for obtaining first information indicative of an orientation of the mobile device at a first time;
    means for determining the reference coordinate system based on the first information; and
    means for refining the reference coordinate system based on second information indicative of the orientation of the device at a second time after the first time.

11. The mobile device of claim 10 wherein the means for determining are configured to convert an orientation of a coordinate system of the mobile device to the reference coordinate system for use with an application of the mobile device.

12. The mobile device of claim 10 wherein the means for obtaining are configured to obtain two non-linear vectors as the first information, at least one of the two non-linear vectors being a gravity vector or a vector of magnetic north.

13. The mobile device of claim 10 wherein the means for determining are configured to set an origin of the reference coordinate system and/or determine a scale value of the reference coordinate system.

14. A processor-readable storage medium of a mobile device, the storage medium comprising processor-readable instructions configured to cause a processor to:
    obtain first information indicative of an orientation of the mobile device at a first time;
    determine the reference coordinate system based on the first information; and
    refine the reference coordinate system based on second information indicative of the orientation of the device at a second time after the first time.

15. The storage medium of claim 14 wherein the instructions configured to cause the processor to determine the reference coordinate system include instructions configured to cause the processor to convert an orientation of a coordinate system of the mobile device to the reference coordinate system for use with an application of the mobile device.

16. The storage medium of claim 14 wherein the instructions configured to cause the processor to obtain the first information include instructions configured to cause the processor to obtain two non-linear vectors as the first information, at least one of the two non-linear vectors being a gravity vector or a vector of magnetic north.

17. The storage medium of claim 14 wherein the instructions configured to cause the processor to determine the reference coordinate system include instructions configured to cause the processor to set an origin of the reference coordinate system and/or determine a scale value of the reference coordinate system.

18. A mobile device comprising:
    a memory storing processor-readable instructions; and
    a processor communicatively coupled to the memory and configured to:
        obtain first information indicative of an orientation of the mobile device at a first time;
        determine a reference coordinate system based on the first information; and
        refine the reference coordinate system based on second information indicative of the orientation of the mobile device at a second time after the first time.

19. The mobile device of claim 18 wherein the processor is configured to convert an orientation of a coordinate system of the mobile device to the reference coordinate system for use with an application of the mobile device.

20. The mobile device of claim 18 wherein the processor is configured to obtain two non-linear vectors as the first information, at least one of the two non-linear vectors being a gravity vector or a vector of magnetic north.

21. The mobile device of claim 18 wherein to determine the reference coordinate system the processor is configured to set an origin of the reference coordinate system and/or determine a scale value of the reference coordinate system.

22. A method of determining a reference coordinate system, the method comprising:
obtaining information indicative of an orientation of a device;
determining an orientation of the reference coordinate system based on a selected application for the reference coordinate system; and
converting an orientation of a device coordinate system to the orientation of the reference coordinate system to produce the reference coordinate system.

23. The method of claim 22 further comprising refining the reference coordinate system based on subsequently obtained information indicative of an orientation of the device.

24. The method of claim 22 wherein the reference coordinate system comprises a SLAM coordinate system.

25. The method of claim 22 wherein the application comprises an AR application.

26. The method of claim 25 wherein the determining comprises receiving an orientation from the AR application.

27. The method of claim 25 wherein the determining is based on a type of augmentation associated with the AR application.

28. The method of claim 27 wherein the type of augmentation comprises text or designs placed on a real-world surface.

29. The method of claim 27 wherein the type of augmentation comprises a character moving on a real-world surface.

30. The method of claim 22 wherein the orientation of the reference coordinate system comprises a substantially horizontal orientation with respect to Earth.

31. The method of claim 22 wherein the orientation of the reference coordinate system comprises a substantially vertical orientation with respect to Earth.

32. The method of claim 22 further comprising setting an origin of the reference coordinate system based on the selected application.

33. A mobile device comprising:
obtaining means for obtaining information indicative of an orientation of a device; and
orientation means, communicatively coupled to the obtaining means, for determining an orientation of a reference coordinate system based on a selected application for the reference coordinate system, the orientation means including converting means for converting an orientation of a device coordinate system of the mobile device to the orientation of the reference coordinate system to produce the reference coordinate system.

34. The mobile device of claim 33 wherein the converting means comprise refining means for refining the reference coordinate system based on subsequently obtained information indicative of an orientation of the device.

35. The mobile device of claim 33 wherein the reference coordinate system comprises a SLAM coordinate system.

36. The mobile device of claim 33 wherein the application comprises an AR application.

37. The mobile device of claim 36 wherein the orientation means comprise means for receiving an orientation from the AR application.

38. The mobile device of claim 36 wherein the determining is based on a type of augmentation associated with the AR application.

39. The mobile device of claim 38 wherein the type of augmentation comprises text or designs placed on a real-world surface.

40. The mobile device of claim 38 wherein the type of augmentation comprises a character moving on a real-world surface.

41. The mobile device of claim 33 wherein the orientation of the reference coordinate system comprises a substantially horizontal orientation with respect to Earth.

42. The mobile device of claim 33 wherein the orientation of the reference coordinate system comprises a substantially vertical orientation with respect to Earth.

43. The mobile device of claim 33 further comprising means for setting an origin of the reference coordinate system based on the selected application.

44. A mobile device comprising:
a memory storing processor-readable instructions; and
a processor communicatively coupled to the memory and configured to:
obtain information indicative of an orientation of a device;
determine an orientation of a reference coordinate system based on a selected application for the reference coordinate system; and
convert an orientation of a device coordinate system of the mobile device to the orientation of the reference coordinate system to produce the reference coordinate system.

45. The mobile device of claim 44 wherein the processor is further configured to refine the reference coordinate system based on subsequently obtained information indicative of an orientation of the device.

46. The mobile device of claim 44 wherein the reference coordinate system comprises a SLAM coordinate system.

47. The mobile device of claim 44 wherein the application comprises an AR application.

48. The mobile device of claim 47 wherein the processor is configured to receive an orientation from the AR application.

49. The mobile device of claim 47 wherein the processor is configured to determine the orientation of the reference coordinate system based on a type of augmentation associated with the AR application.

50. The mobile device of claim 49 wherein the type of augmentation comprises text or designs placed on a real-world surface.

51. The mobile device of claim 49 wherein the type of augmentation comprises a character moving on a real-world surface.

52. The mobile device of claim 44 wherein the orientation of the reference coordinate system comprises a substantially horizontal orientation with respect to Earth.

53. The mobile device of claim 44 wherein the orientation of the reference coordinate system comprises a substantially vertical orientation with respect to Earth.

54. The mobile device of claim 44 wherein the processor is configured to set an origin of the reference coordinate system based on the selected application.

55. A processor-readable storage medium of a mobile device, the storage medium comprising processor-readable instructions configured to cause a processor to:
 obtain information indicative of an orientation of a device;
 determine an orientation of a reference coordinate system based on a selected application for the reference coordinate system; and
 convert an orientation of a device coordinate system of the mobile device to the orientation of the reference coordinate system to produce the reference coordinate system.

56. The storage medium of claim 55 further comprising instructions configured to cause the processor to refine the reference coordinate system based on subsequently obtained information indicative of an orientation of the device.

57. The storage medium of claim 55 wherein the reference coordinate system comprises a SLAM coordinate system.

58. The storage medium of claim 55 wherein the application comprises an AR application.

59. The storage medium of claim 58 further comprising instructions configured to cause the processor to receive an orientation from the AR application.

60. The storage medium of claim 58 wherein the instructions configured to cause the processor to determine the orientation of the reference coordinate system include instructions configured to cause the processor to determine the orientation of the reference coordinate system based on a type of augmentation associated with the AR application.

61. The storage medium of claim 60 wherein the type of augmentation comprises text or designs placed on a real-world surface.

62. The storage medium of claim 60 wherein the type of augmentation comprises a character moving on a real-world surface.

63. The storage medium of claim 55 wherein the orientation of the reference coordinate system comprises a substantially horizontal orientation with respect to Earth.

64. The storage medium of claim 55 wherein the orientation of the reference coordinate system comprises a substantially vertical orientation with respect to Earth.

65. The storage medium of claim 55 wherein the instructions configured to cause the processor to determine the orientation of the reference coordinate system include instructions configured to cause the processor to set an origin of the reference coordinate system based on the selected application.

What is claimed is:

1. A method of determining a reference coordinate system for use by a device, the method comprising:
 obtaining an image frame;
 determining a point cloud based on the image frame; and
 producing the reference coordinate system based on the point cloud by setting an origin of the reference coordinate system to a geometric center of a substantially planar portion of the point cloud.

2. The method of claim 1, further comprising calculating a scale value and wherein the reference coordinate system is produced using the scale value.

3. The method of claim 2, wherein the scale value is calculated based on the point cloud.

4. The method of claim 3, wherein calculating the scale value comprises comparing a dimension of the point cloud to a reference value.

5. The method of claim 2, wherein calculating the scale value comprises calculating the scale value such that an origin of the reference coordinate system will have a predetermined distance from the device.

6. The method of claim 2, wherein calculating the scale value comprises using absolute measurements from one or more input sensors of the device.

7. The method of claim 6, wherein the one or more input sensors comprise an accelerometer, or a plurality of cameras, or a combination thereof.

8. A device for determining a reference coordinate system, the device comprising:
 means for obtaining an image frame;
 means for determining a point cloud based on the image frame; and
 means for producing the reference coordinate system based on the point cloud, including means for setting an origin of the reference coordinate system to a geometric center of a substantially planar portion of the point cloud.

9. The device of claim 8, further comprising means for calculating a scale value, wherein the means for producing the reference coordinate system uses the scale value.

10. The device of claim 9, wherein the means for calculating the scale value use the point cloud.

11. The device of claim 10, wherein the means for calculating the scale value comprises means for comparing a dimension of the point cloud to a reference value.

12. The device of claim 10, the means for calculating the scale value set an origin of the reference coordinate system a predetermined distance from the device.

13. A mobile device comprising:
 a camera configured to obtain an image frame; and
 a processor, communicatively coupled to the camera, configured to:
  determine a point cloud based on the image frame; and
  produce the reference coordinate system based on the point cloud by setting an origin of the reference coordinate system to a geometric center of a substantially planar portion of the point cloud.

14. The mobile device of claim 13, wherein the processor is further configured to calculate a scale value based on the point cloud, and wherein the processor is further configured to produce the reference coordinate system using the scale value.

15. A non-transitory processor-readable storage medium comprising processor-readable instructions configured to cause a processor of a device to:
 obtain an image frame;
 determine a point cloud based on the image frame;
 produce the reference coordinate system based on the point cloud; and
 set an origin of the reference coordinate system to a geometric center of a substantially planar portion of the point cloud.

16. The non-transitory processor-readable storage medium of claim 15, further comprising processor-readable instructions configured to calculate a scale value based on the point cloud, wherein the instructions configured to cause the processor to produce the reference coordinate system use the scale value.

* * * * *